Figure 1:
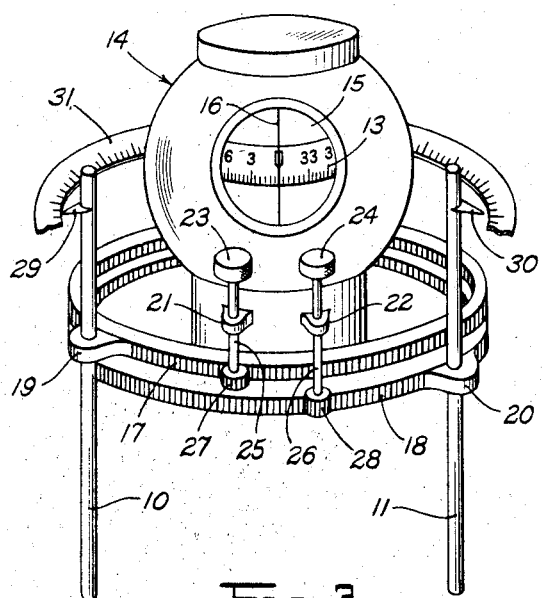

Jan. 26, 1943. P. A. NOXON 2,309,269
COMPENSATING MEANS FOR MAGNETIC COMPASSES
Filed Jan. 23, 1941

INVENTOR.
Paul A. Noxon
BY
ATTORNEYS.

Patented Jan. 26, 1943

2,309,269

UNITED STATES PATENT OFFICE 2,309,269

COMPENSATING MEANS FOR MAGNETIC COMPASSES

Paul A. Noxon, Tenafly, N. J., assignor to Bendix Aviation Corporation, Bendix, N. J., a corporation of Delaware Application January 23, 1941, Serial No. 375,697

6 Claims. (Cl. 33—225)

This invention relates generally to error compensating means for use with magnetic compasses and more particularly to means for compensating such compasses for errors to which they are subject due to the disturbing forces created by a component of the earth's magnetic field threading unsymmetrically disposed soft iron masses in the vicinity of the compasses.

In an effort to compensate magnetic compasses, such, for example, as are employed on shipboard, for the effect produced by the action of the vertical component of the earth's magnetic field upon unsymmetrically disposed soft iron masses present on shipboard, such as masts and funnels, a method known as flinders bar compensation has long been known and used. The structure ordinarily employed in carrying out this method of compensation consists of a vertical cylindrical mass or bundle of soft iron rods contained in a case, variable in finite steps, so arranged as to bring the top end of the mass or bundle on a level with the plane of the magnets of the compass card, with a line joining the center of the cylindrical mass or bundle and the center of the compass card parallel to the fore and aft axis of the ship. The amount of the compensating force exerted thereby is determined in finite increments by increasing or decreasing the cylindrical mass or number of iron rods within the case.

With the use of the foregoing method of compensation it has been desirable that provision be made for installing the flinders bar on some axis other than that above-mentioned. However, practical difficulties such as interference with other compensating mechanisms, or interference with the visibility of the compass card have made it impossible to carry out the foregoing provision.

The present invention contemplates the provision of a novel method and compensating apparatus for magnetic compasses, whereby a compensating effect equivalent to a location on an axis other than the fore and aft axis can be obtained.

An object of the present invention, therefore, is to provide a novel method and compensating apparatus for a magnetic compass for compensating for errors acting thereon due to the vertical component of the earth's magnetic field.

Another object is to provide novel compensating means for a magnetic compass wherein the compensating effect on the compass is variable in a continuous manner rather than in finite increments heretofore provided.

A further object of the invention is to provide a novel compensating means for a magnetic compass so arranged as to provide a magnetic field neutralizing the effect upon the compass of the magnetic field created in the funnels, masts, etc., due to induction by the vertical component of the earth's magnetic field.

Another object is to provide novel compensating means for a magnetic compass comprising a pair of flinders bars mounted for angular movement about the compass whereby the compensating effect created thereby upon the compass may be varied in a continuous manner.

Still another object of the invention is to provide a novel compensating means for a magnetic compass including a pair of flinders bars mounted within the binnacle structure and each being independently adjustable about a circular path concentric with the axis of the compass card.

A still further object is to provide a novel compensating means for a magnetic compass including a pair of flinders bars mounted within the binnacle structure whereby the bars may be adjusted angularly relatively to the compass magnets so as to define an apparent flinders bar providing the desired error compensation for the compass.

The above and further objects and novel features of the invention will more fully appear from the following detailed description when the same is read in connection with the accompanying drawing wherein one embodiment of the invention is illustrated by way of example. It is to be expressly understood, however, that the drawing is for purposes of illustration only and is not intended as a definition of the limits of the invention, reference for this latter purpose being had to the appended claims.

Figure 3:
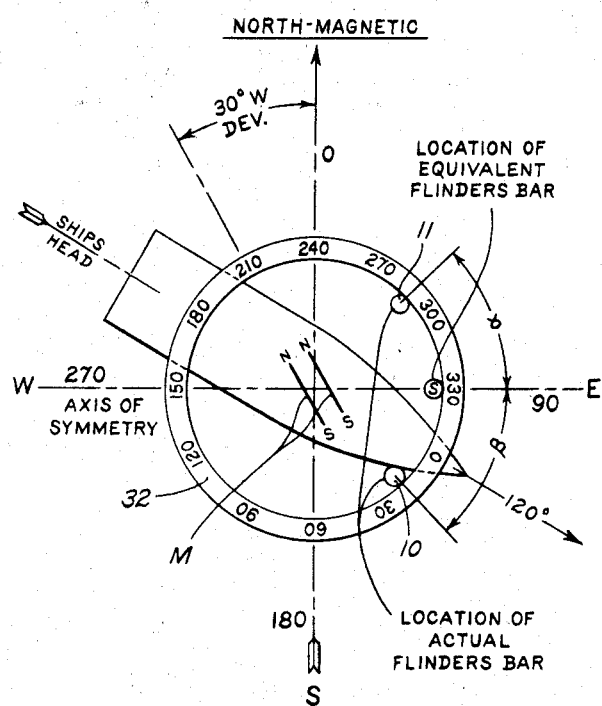
Figure 2:
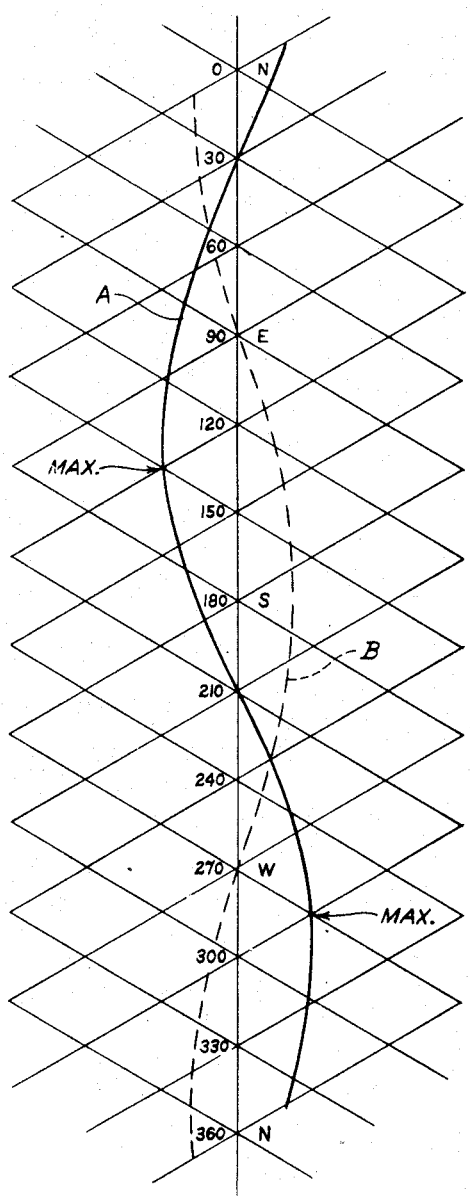

In the drawing, wherein like reference characters refer to like parts throughout the several views, Figure 1 is a perspective view of a magnetic compass provided with compensating means embodying the present invention;

Figure 2 is a Napier Diagram illustrating the deviation of the compass of Figure 1 mounted on a ship whose bearings have been taken about a 360° course resulting from errors induced by the vertical component of the earth's magnetic field in soft iron masses present on shipboard; and, Figure 3 is a diagrammatic illustration of the relative arrangement of the ship's head, compass magnets, and flinders bars about the magnets.

As is well known in the art, numerous corrections must be made for a magnetic compass mounted on shipboard before a true indication of the magnetic north may be obtained and these consist chiefly in the error occurring from the action of the horizontal component of the earth's magnetic field upon the soft iron of the ship or vessel commonly known as quadrantal deviation and the error due to the magnetization of the ship or vessel during its building known as the subpermanent magnetism of the ship or vessel.

Magnetic compass compensation for the above-mentioned errors is determined at the magnetic equator.

Since the angle of dip of the earth's magnetic field at the magnetic equator is zero there is only the horizontal effect of the earth's field to contend with. However, as soon as the ship or vessel has changed her position to some north magnetic latitude the earth's field has developed an angle of dip which varies from zero at the magnetic equator to 90° at the magnetic poles, and as a result vertical components of the earth's magnetic field act upon the vertical soft iron masses, such as, masts, funnels, etc., distributed on shipboard thereby magnetizing the latter whereby undesirable deviation of the compass magnets ensues. This error resulting from the action of the vertical component of the earth's field taken together with the error due to the subpermanent magnetism of the ship is known as semi-circular deviation.

The present invention contemplates the provision of novel means whereby that portion of the semi-circular deviation resulting from the action of the vertical component of the earth's field upon vertical soft iron masses disposed on shipboard is compensated for, and to this end the compensating means comprise, as shown in Figure 1, a pair of flinders bars 10 and 11 formed of a suitable metal adapted to be readily magnetized and de-magnetized without any permanent residual magnetism remaining therein.

Flinders bars 10 and 11 are equal and ordinarily invariable in magnitude and are arranged within the binnacle structure so as to be independently adjustable about a circular path concentric with the axis of the compass card 13 which is mounted within a compass housing 14, exposed to view by way of a window 15 formed in the housing and having a lubbers line 16 formed thereon with which the compass card cooperates.

Two ring gear members 17 and 18 are arranged one above the other concentric with the compass card 13 and are further suitably mounted for rotation about a center coincident with the center of the compass card.

Flinders bar 10 is rigidly secured to ring gear 17 by means of suitable fastening means 19 while flinders bar 11 is secured in a similar manner by way of suitable fastening means 20 to the ring gear 18.

Bracket members 21 and 22 support adjustment knobs 23 and 24 whose supporting shafts 25 and 26 are mounted for rotation within the brackets 21 and 22. Shaft 25 has suitably secured thereto a pinion 27 for engaging the teeth of ring gear 17 while shaft 26 in a similar manner has secured thereto a second pinion 28 for engagement with the ring gear 18. Manual operation of knobs 23 and 24 produces rotation of ring gears 17 and 18 whereby flinders bars 10 and 11 are moved in a circular path concentric with the compass card and its magnets.

Flinders bars 10 and 11 are further provided with pointers 29 and 30 which cooperate with a circular scale 31 likewise being concentric with the compass card. Scale 31 is graduated in degrees in a manner similar to that of a relative bearing circle so that the position of bars 10 or 11 may be independently read from the scale. For purpose of clarity the binnacle structure has not been illustrated in detail since it is well known in the art and constitutes no part of the present invention except that it acts as an enclosure member for the flinders bars 10 and 11.

The induction in soft iron masses due to the vertical component of the earth's field acts to repel or attract the compass magnets carried by compass card 13 from their normal position thereby introducing deviation of the compass needle. For proper compensation the flinders bar must be placed in such a position near the compass as to produce an equal but opposite force to that of the ship's vertical soft iron. The effect produced with the use of a single flinders bar, as is well known in the art, is to create a deviation, as the ship is swung through 360° in azimuth, sinusoidal in character, having two maximum points of opposite signs within the 360° rotation.

If a second and similar bar is introduced in the system at a point 180° opposite to the first bar its effect will be to compensate or cancel the effect of the first bar. If both of the bars are subsequently moved through small equal angles toward each other to a point 90° from their starting position the bars will no longer completely cancel one another but will produce the effect of a smaller or apparent flinders bar located at a point toward which the two bars have been moved, a greater angle of movement producing a greater effect, until the maximum is reached at a point near the point of contact of the two bars. A line joining the center of the apparent flinders bar formed by the movement of the two bars toward each other and the center of the compass card is termed and referred to as the axis of symmetry.

In applying the desired compensation with the structure hereinabove described, it is assumed that all compensation for quadrantal deviation and semi-circular deviation resulting from the subpermanent magnetism of the ship has been carried out at the magnetic equator with the flinders bars removed from the binnacle. The ship subsequently is made to change her position to some North magnetic latitude and is thereafter swung through 360° and readings of the compass taken and recorded. Due to the induced magnetic field produced by the vertical component of the earth's field a deviation curve is obtained such as that shown by the solid line A on the Napier diagram of Figure 2.

The curve of Figure 2 shows the action of the soft iron's induced field upon the compass magnets and is entirely semi-circular in character having a maximum westerly deviation at a course of 120°, a maximum easterly deviation at a course of 300° and zero deviation at a course of 30° and 210°. Were the resultant induced field of the ship's vertical soft iron at the fore and aft axis of the ship the maximum deviation would have been at 90° and 270° with zero deviation at 0° and 180°. The curve represented by the solid line A of Figure 2, therefore, makes it apparent that the resultant induced field of the ship's vertical soft iron is on an axis other than the ship's fore and aft axis.

With the conventional flinders bar arrangement the ship would be caused to head east or west and the correction applied at the forward end of the binnacle to bring the deviation at that point to zero. However, since the deviation represented by the solid line A of Figure 2 was caused by vertical soft iron not on the ship's fore and aft axis, the conventional procedure would not produce a correct result but would cause an over compensation and shifting of the error. This latter effect is represented by the dotted line curve B of Figure 2.

Since the course at which the maximum deviation was read is that of 120° magnetic it is apparent that the correction to be applied must produce its maximum effect on the latter course at which point the compass magnets M of Figure 3 have a westerly deviation of 30°. The top ends of the flinders bars 10 and 11 form south poles due to the earth's induction and as they are angularly moved toward each other by manipulation of knobs 23 and 24 they define an apparent flinders bar at a point intermediate each other.

As is known in the art, the maximum effect produced by a finders bar occurs when the line joining its center and the center of the compass card lies magnetic east or west. From Figure 3 it is seen that the axis of symmetry for adjustment of the two flinders bars is a line joining 330° and 150° graduations on the relative bearing scale 32 on the binnacle.

It already has been pointed out above that the top end of the flinders bars 10 and 11 in the north magnetic hemisphere become south poles by virtue of the induction of the earth's field. The location of the apparent or equivalent flinders bar to be produced will be at 330° on the scale 31 of Figure 3. Steaming a course of 120°, therefore, the bars 10 and 11 are angularly moved toward 320° on scale 32 until the compass magnets M return to their normal zero or true magnetic north position. The polarity of the apparent flinders bar is such as to repel the south poles of the magnets M in a clockwise direction and thus the deviation error is compensated. With the final adjustment, the compass is completely compensated and further variation thereafter in magnetic latitude will have little or no effect on deviation since the compass error and the compensation factor change together in a manner well known in the art.

It will now become readily apparent to those skilled in the art that a novel method and apparatus for carrying out the method have been provided, whereby the deviation error resulting from the induction in the ship's vertical soft iron by the vertical component of the earth's field is compensated. The novel apparatus hereinabove described permits the arrangement of the flinders bars within the compass binnacle structure on an axis other than the fore and aft axis of the ship and further provides an arrangement whereby the compensating factor is readily varied in a continuous manner as distinguished from that heretofore known in the art.

Should it be necessary to provide for a great range of adjustment it can be accomplished with convenience by making the flinders bars 10 and 11 variable in increments. These increments can be very large, however, and in the majority of cases such additional adjustment would not be required.

Although only one embodiment of the present invention has been illustrated and described in detail, it is to be expressly understood that the invention is not limited thereto. Various changes can be made in the design and arrangement of the parts without departing from the spirit and scope of the invention as the same will now be understood by those skilled in the art. For a definition of the limits of the invention, reference will be had primarily to the appended claims.

What is claimed is:

1. Direction indicating means for a craft, comprising a compass mounted on said craft and subject to errors due to the effect of the vertical component of the earth's field upon soft iron masses aboard said craft, means comprising parallel flinders bars providing a magnetic field at the compass, and means mounting each of said bars for independent revolution about the pivot axis of said compass.

2. Direction indicating means for a craft, comprising a magnetic compass mounted on said craft and subject to errors due to the effect of the vertical component of the earth's field upon soft iron masses aboard said craft, a pair of parallel flinders bars each providing a magnetic field at the compass, and means mounting each of said bars for independent revolution about the pivot axis of said compass.

3. Direction indicating means for a craft, comprising a magnetic compass mounted on said craft and subject to errors due to the effect of the vertical component of the earth's field upon soft iron masses aboard said craft, a pair of parallel and substantially cylindrical flinders bars, mounted for each of said bars providing a magnetic field at the compass, means mounting each of said bars for independent revolution about the pivot axis of said compass, and manually operable means connected with said mounting means for selectively moving each of said bars about the compass pivot axis to a predetermined point at which said bars define an apparent flinders bar opposing and neutralizing the effect of said vertical component on said compass.

4. Direction indicating means for a craft, comprising a magnetic compass mounted on said craft and subject to errors due to the magnetic field induced in vertical soft iron masses aboard said craft resulting from the action thereon of the vertical component of the earth's field, the resultant of said induced magnetic field acting on said compass on an axis other than the fore and aft axis of said craft and above a normally horizontal plane containing said compass, flinders bars arranged below the horizontal plane containing said compass and having the upper ends thereof substantially coinciding with the horizontal plane containing said compass whereby the effective fields of said bars have a polarity opposite to the polarity of the effective induced magnetic field, and means mounting said bars for selective and independent revolution about the pivot axis of said compass.

5. Compensating means for a magnetic compass subject to deviation error due to the effect of the vertical component of the earth's field upon soft iron masses aboard the craft on which the compass is mounted comprising parallel flinders bars providing a magnetic field at the compass, means mounting each of said bars for independent revolution about the pivot axis of said compass, and manually operative means engaging said mounting means for positioning each of said bars.

6. Compensating means for a magnetic compass subject to deviation error due to the effect of the vertical component of the earth's field upon soft iron masses aboard the craft on which the compass is mounted, comprising a pair of parallel and substantially similar flinders bars providing a magnetic field at the compass, means comprising a pair of annular members for mounting each of said bars for independent revolution about the pivot axis of said compass, and manually operative means engaging each of said mounting members for positioning each of said bars.

PAUL A. NOXON.